Patented Aug. 20, 1940

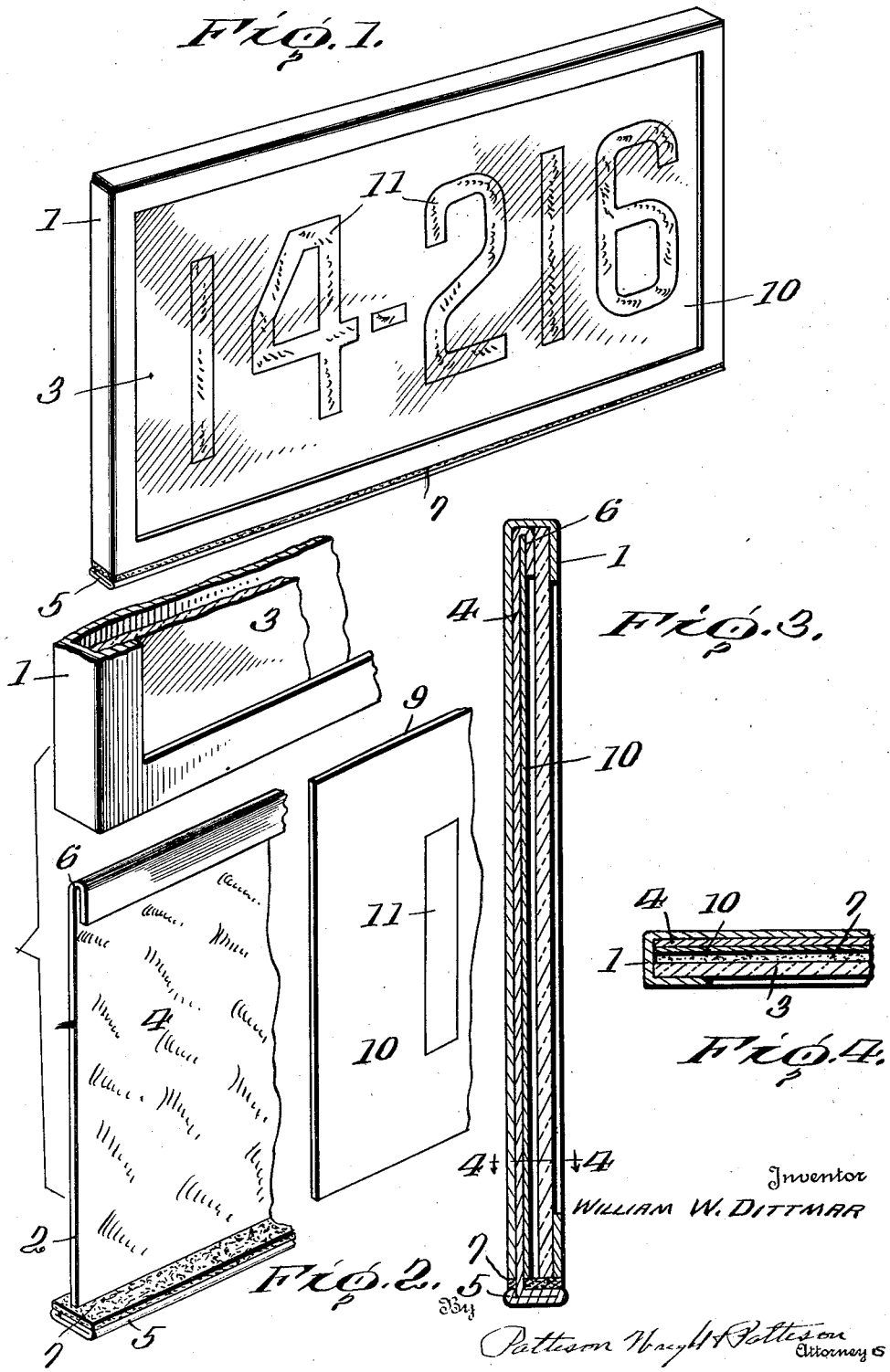

2,211,923

UNITED STATES PATENT OFFICE 2,211,923

LICENSE PLATE AND HOLDER

William W. Dittmar, Williamsport, Pa.

Application November 10, 1938, Serial No. 239,863

4 Claims. (Cl. 40—135)

This invention relates to certain new and useful improvements in an automobile license plate and holder, the main object of the invention being to provide a license plate which is exceedingly simple and cheap in construction, the same being formed of a sheet of flexible material such as Cellophane or the like rendered opaque by coating the same with ink or the like except spaces in the form of letters, figures, symbols or the like whereby said plate will be very light in construction and can be shipped through the mail very cheaply.

Another object of my invention is to provide a holder for said license plate which will last the life of an automobile and can be furnished by the maker or purchased by the owner of the automobile and so constructed as to receive a license plate and hold it in the proper position so that the letters, figures, or symbols will be displayed brilliantly.

With my invention it is possible to manufacture a license plate of the desired color to meet the various State requirements and to ship said plate very cheaply to the owner of an automobile, upon receipt of which the owner can replace the same in the holder by removing the expired license plate and substitute a new plate therefor whereby not only the States will be saved a great deal of expense, but a more practical license plate will be provided so that the characters or symbols can be readily distinguished.

Another and further object of the invention is to provide a novel form of holder formed of two telescoping sections, one of which is adapted to receive and hold the license plate while it is being slid into position within the other member of the holder.

Another object of my invention is to provide a backing of brilliant material which will reflect the light in all directions so that when said brilliant material is disposed to the rear of the license plate, the characters or symbols or the like can be clearly distinguished.

Other and further objects and advantages of the invention will be hereinafter set forth and the novel features thereof defined by the appended claims.

In the drawing,

Figure 1 is a perspective view of a holder showing my improved construction of license plate in position therein;

Figure 2 is a detail perspective view showing a portion of the two sections of the holder with the license plate in position ready to be secured together;

Figure 3 is a vertical section through the same; and

Figure 4 is an enlarged detail section taken on line 4—4 of Figure 3.

In carrying out my invention I form the holder of two sections 1 and 2 adapted to be telescoped one within the other, the section 1 being in the form of a rectangular casing having an open side over which is arranged a transparent face plate 3 which is secured therein by adhesive material, said plate being formed of glass or any other of the new transparent material now on the market which is slightly flexible and non-breakable. The casing is provided with a slot in its bottom adapted to receive the section 2 as will be later described.

The member 2 or holder is in the form of a plate 4 having a flanged lower edge 5, the upper edge of which is turned back to form a channel 6 for the purpose hereinafter fully described.

In order to form a dust and moisture proof holder for the license plate I arrange a packing 7 against the flange 5 so that when the two members are moved into the position as shown in Figure 1, a dust and moisture proof receptacle will be formed for the license plate as will be hereinafter fully described.

The holder can be supported on the automobile by any desired construction of bracket but I preferably use a bracket in which the top and bottom of the holder are engaged and between which the same is clamped so as to lock the two sections in position as shown in Figures 1 and 3.

My improved construction of license plate is preferably formed of a transparent flexible sheet of Cellophane or the like which may be tinted any color, for example, tinted to have an amber appearance and rendered opaque by coating with ink or the like as shown at 10 to form a plate of the desired color, except for the space 11 in the form of letters, symbols or the like which are transparent.

One face of the plate 4 is formed brilliant by etching or by coating the same or by securing thereto a sheet of brilliant material so as to form a reflecting surface to reflect a light in all directions whereby the numerals, figures, symbols or the like in the flexible license plate will stand out brilliantly.

To insert a new license plate within the holder, it is only necessary to draw downwardly on the member 2 and to remove the same from the member 1. The sheet of Cellophane forming the license plate is placed against the brilliant face of the plate 4 with its upper edge in the groove 6 and it is of course, understood that it is formed of a size to conform to the area of the plate 4 which protects the upper edge of the license plate and allows the plate 4 to slide within the member 1 to the rear of the transparent plate 3 which holds the various members in their proper flat position.

As the members are protected by the packing against dust and moisture, a license plate and holder is provided which has a great many advantages not enumerated herein over prior constructions and particularly over the universal form of metal license plate now in use as it can be manufactured much cheaper, can be transported much cheaper and the coating of coloring material forming the opaque portion of the plate is protected by the face plate so that it is only necessary to wash the face plate in order to restore the brilliancy of the license plate to its original condition.

In the actual use of my improved construction of license plate and holder, the license plate which is formed of Cellophane or the like, is coated with a composition or an ink of the desired color to meet the requirements of the State in which the license plate is to be used and as the colors change yearly, it will be apparent that the cost of manufacturing the flexible license plate is greatly reduced.

While in the drawing and description I have shown and described a license plate formed of flexible, transparent sheet of material having a major portion rendered opaque, it is, of course, understood that the portion forming the letters, figures, symbols or the like, can be formed opaque and the other portion transparent.

From the foregoing description it will be seen that I have provided a very novel form of license plate and holder wherein the cost of manufacturing the same is greatly reduced and the plate will maintain its brilliancy throughout the life of the same as it is thoroughly protected.

What I claim is:

1. A license plate and holder comprising a holder formed of two sections, one telescoping within the other, one section being provided with a transparent plate and the other with a backing plate having a brilliant surface and a sheet of flexible transparent material disposed on the backing plate, said sheet of transparent material having portions thereof rendered opaque.

2. An automobile license holder and plate comprising a sectional holder formed of two sections, one adapted to telescope within the other, one of said sections having a transparent side and the other section being provided with a brilliant surface and a flexible transparent license plate having a portion rendered opaque to produce transparent figures, symbols, letters or the like disposed in advance of said brilliant surface.

3. As a new article of manufacture, a license plate comprising a holder composed of two sections, one telescoping within the other, the outer section being provided with a transparent side and the inner section being provided with a brilliant surface and a transparent flexible license plate arranged on the inner section having a portion thereof rendered opaque to produce transparent figures, letters, symbols or the like.

4. An automobile license holder and plate comprising a sectional holder formed of two sections, one adapted to telescope within the other, one of said sections being provided with an opening, the other section having a brilliant inner surface in alignment with said opening and a channel along one edge, a flexible license plate having a transparent portion and an opaque portion to produce figures, symbols, letters and the like disposed against said brilliant inner surface of said section having its edge disposed in said channel and held in position upon said section thereby while said section is being telescoped within the other section.

WILLIAM W. DITTMAR.